United States Patent
Chuppala

(10) Patent No.: US 12,289,190 B2
(45) Date of Patent: Apr. 29, 2025

(54) SYSTEM AND METHOD TO REDUCE LATENCY IN SERIAL FFT BASED OFDM RECEIVER SYSTEMS WITH DE-INTERLEAVER

(71) Applicant: Cypress Semiconductor Corporation, San Jose, CA (US)

(72) Inventor: Harish Chuppala, Kurnool (IN)

(73) Assignee: Cypress Semiconductor Corporation, San Jose, CA (US)

( * ) Notice: Subject to any disclaimer, the term of this patent is extended or adjusted under 35 U.S.C. 154(b) by 156 days.

(21) Appl. No.: 18/173,600

(22) Filed: Feb. 23, 2023

(65) Prior Publication Data

US 2024/0291703 A1 Aug. 29, 2024

(51) Int. Cl.
*H04L 27/26* (2006.01)
*H04L 25/02* (2006.01)
*H04L 25/03* (2006.01)

(52) U.S. Cl.
CPC ...... *H04L 27/2651* (2021.01); *H04L 25/0202* (2013.01); *H04L 25/03019* (2013.01)

(58) Field of Classification Search
CPC ... H04B 1/00; H04B 1/04; H04B 1/10; H04B 1/0475; H04B 17/00; H04L 25/03; H04L 25/0202; H04L 25/497; H04L 25/03019; H04L 27/00; H04L 27/2651
USPC ....... 375/141, 219, 227, 260, 267, 316, 340, 375/346

See application file for complete search history.

(56) References Cited

FOREIGN PATENT DOCUMENTS

IN    201841021999 A  * 12/2019  ............... H04B 1/00
WO   WO-2004030233 A1 *  4/2004  ......... H04L 25/0236

* cited by examiner

*Primary Examiner* — Shawkat M Ali

(57) ABSTRACT

One or more devices, systems, and/or methods are provided. In an example of the techniques presented herein, a receiver has a receiver front end configured to receive time domain data in natural order, a fast Fourier transform module configured to generate frequency domain data in digit reversed order based on the time domain data, a demodulator configured to generate first demodulated data in digit reversed order based on the frequency domain data, and a de-interleaver configured to perform a reordering permutation on the first demodulated data to generate second demodulated data in natural order.

15 Claims, 5 Drawing Sheets

| | | | | | | | |
|---|---|---|---|---|---|---|---|
| L-STF 202 | L-LTF 204 | L-SIG 206 | VHT-SIG-A 208 | VHT-STF 212 | VHT-LTF 214 | VHT-SIG-B 210 | DATA 216 |

Fig. 2

| ORIGINAL NUMBER | ORIGINAL DIGIT ORDER | REVERSED DIGIT ORDER | DIGIT-REVERSED NUMBER |
|---|---|---|---|
| 0 | 000 | 000 | 0 |
| 1 | 001 | 100 | 16 |
| 2 | 002 | 200 | 32 |
| 3 | 003 | 300 | 48 |
| 4 | 010 | 010 | 4 |
| 5 | 011 | 110 | 20 |
| ⋮ | ⋮ | ⋮ | ⋮ |

Fig. 3

SYSTEM AND METHOD TO REDUCE LATENCY IN SERIAL FFT BASED OFDM RECEIVER SYSTEMS WITH DE-INTERLEAVER

BACKGROUND

Orthogonal frequency-division multiplexing (OFDM) and OFDM multiple access (OFDMA) transceivers transmit data signals by spreading the data across multiple simultaneous subcarrier channels with different frequencies. Interleaving operations are used to spread the data bits across the subcarrier frequencies, to alternate the least significant and most significant bit arrangements, and/or to perform frequency rotations to increase channel diversity and improve performance. Fast Fourier transform and inverse fast Fourier transform (FFT/IFFT) operations are performed on the signals to convert from time domain to frequency domain signals. In a receiver, FFT operations separate the subcarriers to allow retrieving the data bits. De-interleaving operations are performed to return the data bits to the original order.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In an embodiment of the techniques presented herein, a receiver is provided. The receiver comprises a receiver front end configured to receive time domain data in natural order, a fast Fourier transform module configured to generate frequency domain data in digit reversed order based on the time domain data, a demodulator configured to generate first demodulated data in digit reversed order based on the frequency domain data, and a de-interleaver configured to perform a reordering permutation on the first demodulated data to generate second demodulated data in natural order.

In an embodiment of the techniques presented herein, a system is provided. The system comprises means for receiving time domain data in natural order, means for performing a fast Fourier transform operation to generate frequency domain data in digit reversed order based on the time domain data, means for generating first demodulated data in digit reversed order based on the frequency domain data, means for performing a reordering permutation on the first demodulated data to generate second demodulated data in natural order, and means for extracting data from the second demodulated data.

In an embodiment of the techniques presented herein, a method is provided. The method comprises receiving time domain data in natural order, performing a fast Fourier transform operation to generate frequency domain data in digit reversed order based on the time domain data, generating first demodulated data in digit reversed order based on the frequency domain data, performing a reordering permutation on the first demodulated data to generate second demodulated data in natural order, and extracting data from the second demodulated data.

In an embodiment of the techniques presented herein, a receiver is provided. The receiver comprises a receiver front end configured to receive time domain data in natural order, a fast Fourier transform module configured to generate frequency domain data in digit reversed order based on the time domain data, a channel equalizer configured to equalize the frequency domain data to generate equalized frequency domain data in digit reversed order, a demodulator configured to generate first demodulated data in digit reversed order based on the equalized frequency domain data, a de-interleaver configured to perform a reordering permutation and at least one reverse permutation on the first demodulated data to generate second demodulated data in natural order, and a descrambler configured to extract data from the second demodulated data.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 2 is a diagram illustrating a frame employed by a receiver, in accordance with some embodiments.

FIG. 3 is a diagram of a reverse bit order mapping table, in accordance with some embodiments.

DETAILED DESCRIPTION

Figure 1:
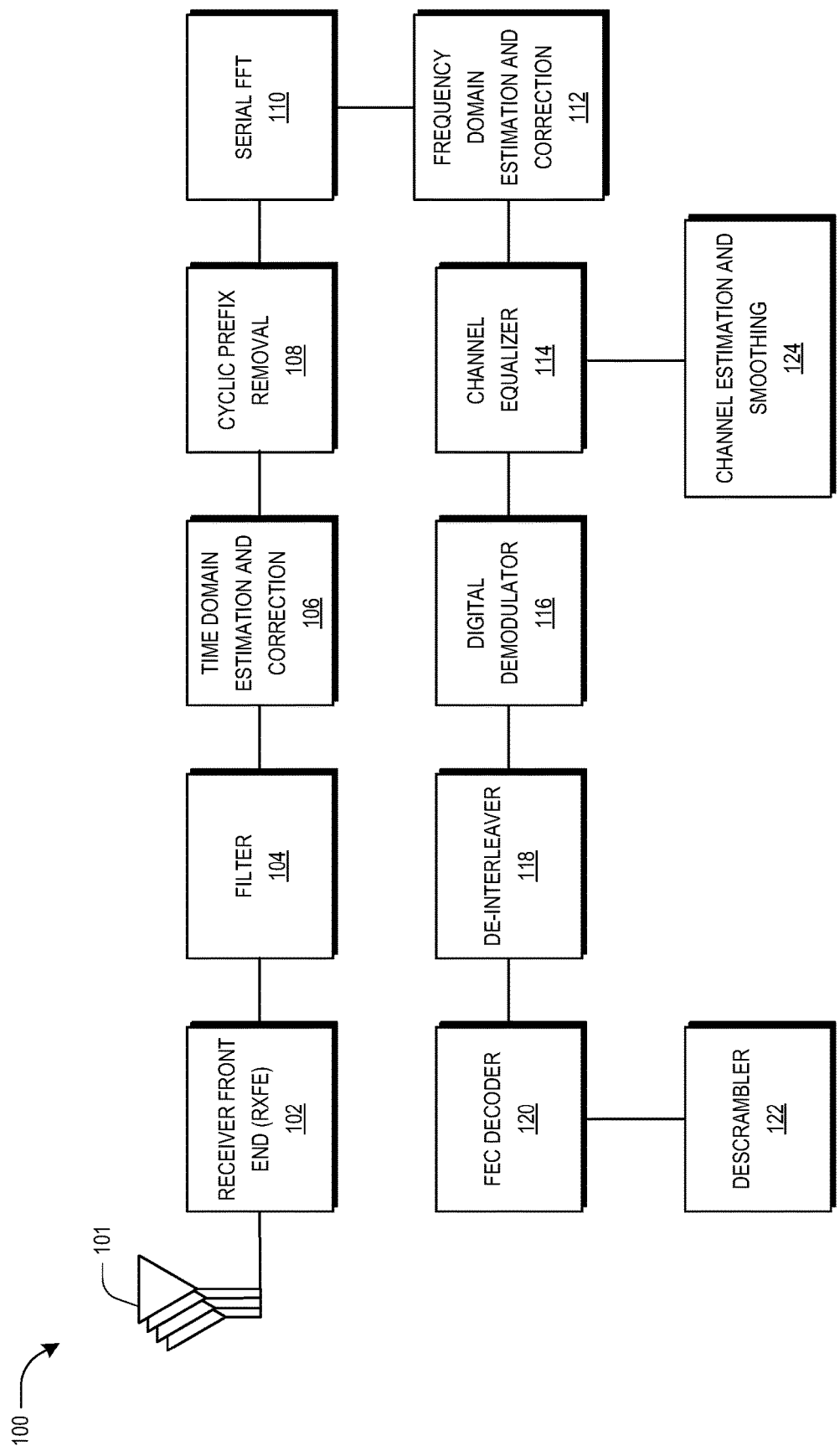
FIG. 1 is a diagram of a receiver, in accordance with some embodiments.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

It is to be understood that the following description of embodiments is not to be taken in a limiting sense. The scope of the present disclosure is not intended to be limited by the embodiments described hereinafter or by the drawings, which are taken to be illustrative only. The drawings are to be regarded as being schematic representations and elements illustrated in the drawings are not necessarily shown to scale. Rather, the various elements are represented such that their function and general purpose become apparent to a person skilled in the art.

All numerical values within the detailed description and the claims herein are modified by "about" or "approximately" the indicated value, and take into account experimental error and variations that would be expected by a person having ordinary skill in the art.

In serial FFT/IFFT based OFDM/OFDMA systems, in addition to latency caused by serial processing of the subcarriers, an additional latency is incurred for reordering bits. Since the output of the serial FFT is generated with out-of-order indices or digit reversed indices, an index reordering operation is performed at the output of the serial FFT. In some embodiments, latency and memory usage are reduced by processing data bits in reverse bit order instead of performing bit reordering after the serial FFT. An additional de-interleaving permutation is employed to return the data bits to the original order.

FIG. 1 is a diagram of receiver 100, in accordance with some embodiments. The receiver 100 includes an antenna array 101, a receiver front end (RxFE) 102, a filter 104, a time domain estimation and correction module 106, a cyclic prefix removal module 108, a serial FFT module 110, a frequency domain estimation and correction module 112, a channel equalizer 114, a digital demodulator 116, a de-interleaver 118, a forward error correction (FEC) decoder 120, a descrambler 122, and a channel estimation and smoothing module 124. Other structures and/or configurations of the receiver 100 are within the scope of the present disclosure.

In some embodiments, the antenna array 101 includes multiple antennas configured as a multiple input multiple output (MIMO) system. The RxFE 102 performs amplification and signal processing functions on the received time domain signal. The RxFE 102 converts passband data to baseband data using a mixer/downconversion operation. The RxFE 102 includes an analog-to-digital converter (ADC) and generates a digital output. The filter 104 may be configured to reduce noise in the received signal and pass the frequency bands used by the receiver 100. The time domain estimation and correction module 106 estimates and corrects timing offsets associated with the sub-carriers. The cyclic prefix removal module 108 removes cyclic prefix symbols that were inserted in the symbol stream by the transmitter. The serial FFT module 110 receives the time domain signal and generates a frequency domain signal. The frequency domain estimation and correction module 112 estimates and corrects for carrier frequency offsets, sampling frequency offsets, phase noise error, and/or other suitable channel characteristics. The channel equalizer 114 equalizes the OFDM data using channel estimates. The digital demodulator 116 converts baseband or digital i/q data to demodulated data (e.g., soft/hard bits). The digital demodulator 116 demodulates uses quadrature phase shift keying (QPSK), quadrature amplitude modulation, binary phase shift keying (BPSk), and/or some other suitable demodulation technique. The de-interleaver 118 reorders demodulated data processed in reverse digit order and reverses the data interleaving operations performed by the transmitter. The forward error correction (FEC) decoder 120 uses error correction techniques to correct bits with errors. The descrambler 122 reverses data scrambling operations performed by the transmitter and extracts the data carried by the OFDM signal.

Training data is used to configure the receiver 100 for processing data, the training data is known so it is not processed by the digital demodulator 116, the de-interleaver 118, the forward error correction (FEC) decoder 120, or the descrambler 122. The payload data is extracted using the configured receiver 100 and the data is passed to upper layers of the receiver 100, such as a medium access control (MAC) layer.

The channel estimation and smoothing module 124 uses training data with known values embedded in the transmitted data to estimate the channel conditions to configure the channel equalizer 114 with channel equalization data to improve the performance when actual data is received. The channel estimation and smoothing module 124 estimates the impulse response of the channel and generates channel equalization data. The training data is also used for training the time domain estimation and correction module 106 and the frequency domain estimation and correction module 112.

Referring to FIG. 2, a diagram illustrating a frame 200 employed by the receiver 100 is shown, in accordance with some embodiments. In some embodiments, the frame 200 includes training data for time and frequency domain channel estimation and correction and payload data. The frame 200 of FIG. 2 is formatted according to the 802.11ac standard, however other frame formats are contemplated, such as 802.11a/n/ax/be, 4G OFDMA, or some other frame format. The frame 200 illustrated in FIG. 2A comprises an L-STF field 202 and an L-LTF field 204 used for frame identification and front end synchronization, an L-SIG field 206 that describes data rate and frame length, a VHT-SIG-A field 208 and a VHT-SIG-B field 210 that describe channel width, modulation-coding, and single user versus multiple user usage, a VHT-STF field 212 used for gain adjustment, a VHT-LTF field 214 used for channel and time/frequency domain estimation and correction, and a data field 216 that carries data from upper layers.

According to some embodiments, the receiver 100 performs certain operations in reverse digit order, thereby obviating the need to re-order the data between operations and reducing latency and memory usage. For example, a serial FFT operation receives input data in natural order and outputs data in digit reversed order. FIG. 3 is a diagram 300 illustrating digit reversal for an N=64 and radix-4 FFT, which produces an output resulting in 2-digit digit reversed order. To perform a 2-digit digit-reverse ordering, the two least significant bits are swapped with the two most significant bits and then the second pair of least significant bits are swapped with the second pair of most significant bits. In another example, not illustrated in FIG. 3, for an N=64 and radix 2 FFT, if the input order is 0, 1, 2, 3 then the digit reversed number will be 0, 32, 16, 48 . . . .

In some embodiments, digit reordering is handled by the de-interleaver 118. Data is interleaved in the transmitter to improve performance by increasing spectral diversity. Interleaving schemes are defined by the appropriate standard. For example, according to the WLAN 802.11n standard, data interleaving is performed using 2 permutations. Interleaving in the transmitter is a block operation which is applied after the reception of $N_{cbps}$ bits (number of coded bits per OFDM symbol) in the order $b_k$, where k is from 0 to $N_{cbps}-1$. The output of the interleaving operation is in the order $b_j$, where the relation between k and j is determined in terms of permutations. For WLAN, the index of the coded bit before the first permutation is denoted by k; I is the index after the first and before the second permutation; and j is the index after the second permutation. According to the standard, the first permutation is defined by the rule:

$$i = N_{row} * (k \bmod N_{col}) + \text{Floor}(k / N_{col}), \quad (1)$$

where k=0, 1 . . . , $N_{cbps}-1$.

The second permutation is defined by the rule:

$$j = a * \text{Floor}(i/a) + ((i + N_{cbps} - \text{Floor}(N_{col} * i / N_{cbps})) \bmod a), \quad (2)$$

where i=0, 1 . . . , $N_{cbps}-1$.

The function Floor( ) denotes the largest integer not exceeding the parameter. $N_{row}$ and $N_{col}$ are the number of rows and number of columns of the block interleaving function. The value of a is determined by the number of coded bits per subcarrier, $N_{BPSC}$, according to a=max ($N_{BPSC}/2$, 1).

The output of the serial FFT module 110 is in digit reversed order, as illustrated in FIG. 3. The frequency domain estimation and correction module 112, the channel equalizer 114, and the digital demodulator 116 process the data in digit reversed order rather than re-ordering the data after the serial FFT module 110. Eliminating the reordering reduces latency in the receiver 100 and reduces memory usage. The de-interleaver 118 performs digit reordering in addition to reversing the interleaving operations implemented by the receiver 100.

Figure 4:
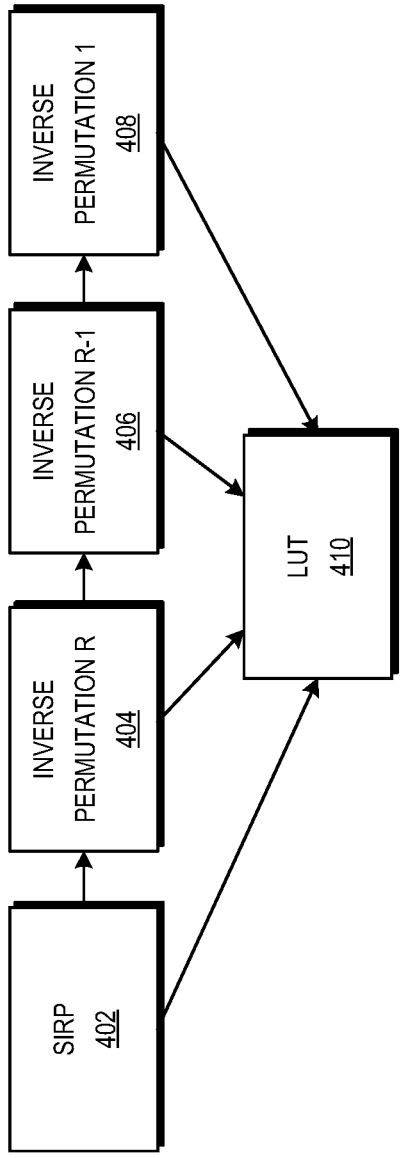
FIG. 4 is a diagram of a de-interleaving flow, in accordance with some embodiments.

Referring to FIG. 4, a diagram of a de-interleaving flow 400 is provided, in accordance with some embodiments. The de-interleaver 118 performs a substitute index order permutation (SIRP) 402, and inverse permutations 404, 406, 408 for the R permutations implemented in the interleaving operation by the transmitter. The de-interleaver 118 may be accessed multiple times during a frame, depending on the length of the data field. As described above in Equations (1) and (2), R=2 for the WLAN 802.11n standard. The interleaving defined by Equation 2 is de-interleaved by swapping the i and k indexes and the interleaving defined by Equation 2 is de-interleaved by swapping the i and j indexes. The SIRP 402 comprises an additional permutation that reorders the bits from digit reversed order to natural account for the digit reversed output of the serial FFT module 110 prior to the application of the inverse permutations 404, 406, 408. The SIRP 402 exchanges the bits of one subcarrier onto the bits of the digit reversed subcarrier index. The de-interleaving flow 400 may be implemented by combining the SIRP 404 and the inverse permutations 404, 406, 408 into a look-up table 410, since the operations are known in advance. The use of the look-up table 410 reduces latency since it is generated in advance from the known permutations and does not require computation or reordering.

The SIRP 402 uses a mapping from bits(bi) of digit reversed ordered indices/tones to j.

$$\text{for } bi = 0 \text{ to } Ncbps - 1 \text{ (1 increment)}$$
$$rtone = digitreverse(bi / NBPSC, \text{radix});$$
$$j = rtone + rem(bi / NBPSC);$$
$$\text{end}$$

The range of the digit reversed indices is from 0 to N−1, where N is FFT size/number of tones/subcarrier. Depending on the digital modulation used, NBPSC may differ, so the number of bits provided to the de-interleaver 118 may vary accordingly. The divisor operator is similar to the mod operator (e.g. 5/6=0), radix is same as FFT radix, and rem is remainder of division (e.g., 5/6=5). The digitreverse function which maps the data shown in FIG. 3 between original number and digit reversed number and vice versa.

Figure 5:
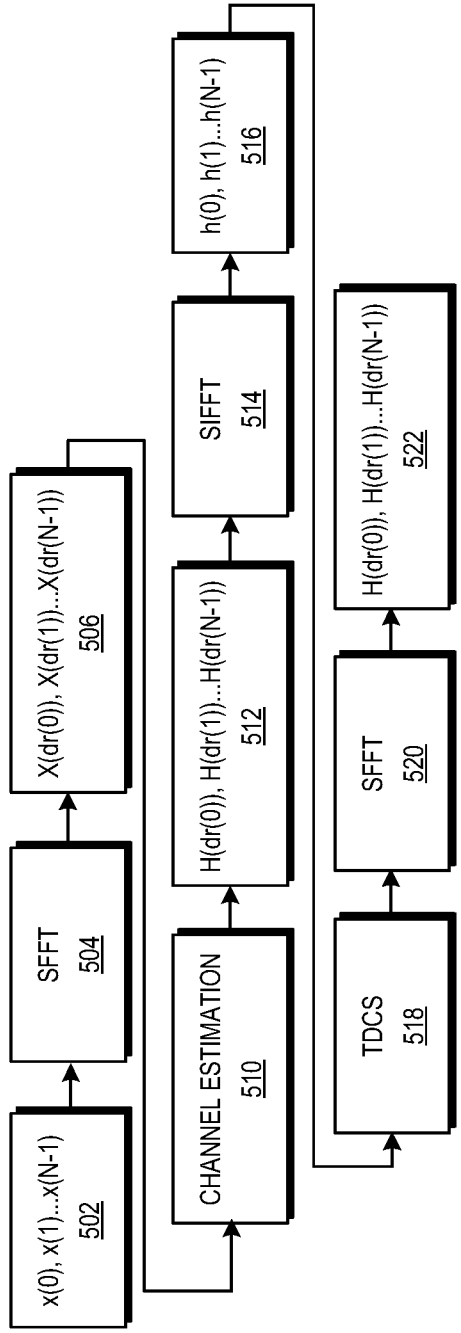
FIG. 5 is a diagram illustrating a channel estimation and smoothing flow, in accordance with some embodiments.

Referring to FIG. 5, a diagram illustrating a flow 500 implemented by the channel estimation and smoothing module 124 is provided, in accordance with some embodiments. In some embodiments, the channel estimation and smoothing module 124 performs channel estimation multiple times during a frame, depending on the number of training fields.

At 502, the time domain training data extracted from the VHT-LTF field 214 of the frame 200 is in natural order. At 504, a serial FFT operation is performed to transform the time domain data to frequency domain data. At 506, the frequency domain data is in digit reversed order, as indicated by the notation "dr ( . . . )" which represents the mapping from the table 300 in FIG. 3 from the original number to the digit reversed number. At 510, channel estimation is performed using training data (e.g., provided in the VHT-LTF field 214 of the frame 200) using the digit reversed data to generate frequency domain transfer function data in digit reversed order at 512. At 514, a serial IFFT operation is performed to transform the frequency domain data to time domain data. At 516, the time domain data is in natural order. At 518, a time domain channel smoothing operation is performed. At 520, a serial FFT operation is performed to transform the time domain data to frequency domain data. At 522, the frequency domain data is in digit reversed order. The channel equalization data generated at 522 is provided to the channel equalizer 114 of the receiver 100 to tune the receiver according to the channel conditions to allow the processing of actual data.

The channel estimation at 510 is performed using data in digit reversed order and the channel equalization by the channel equalizer 114 is performed using data in digit reversed order, so the reordering of the data after the serial FFT module 110 is not performed, thereby reducing latency and memory usage. In the channel estimation and smoothing module 124, reordering of the data after the SFFT at 504, the SIFFT at 514, and the SFFT at 520 is not performed further reducing latency and memory usage.

Figure 6:
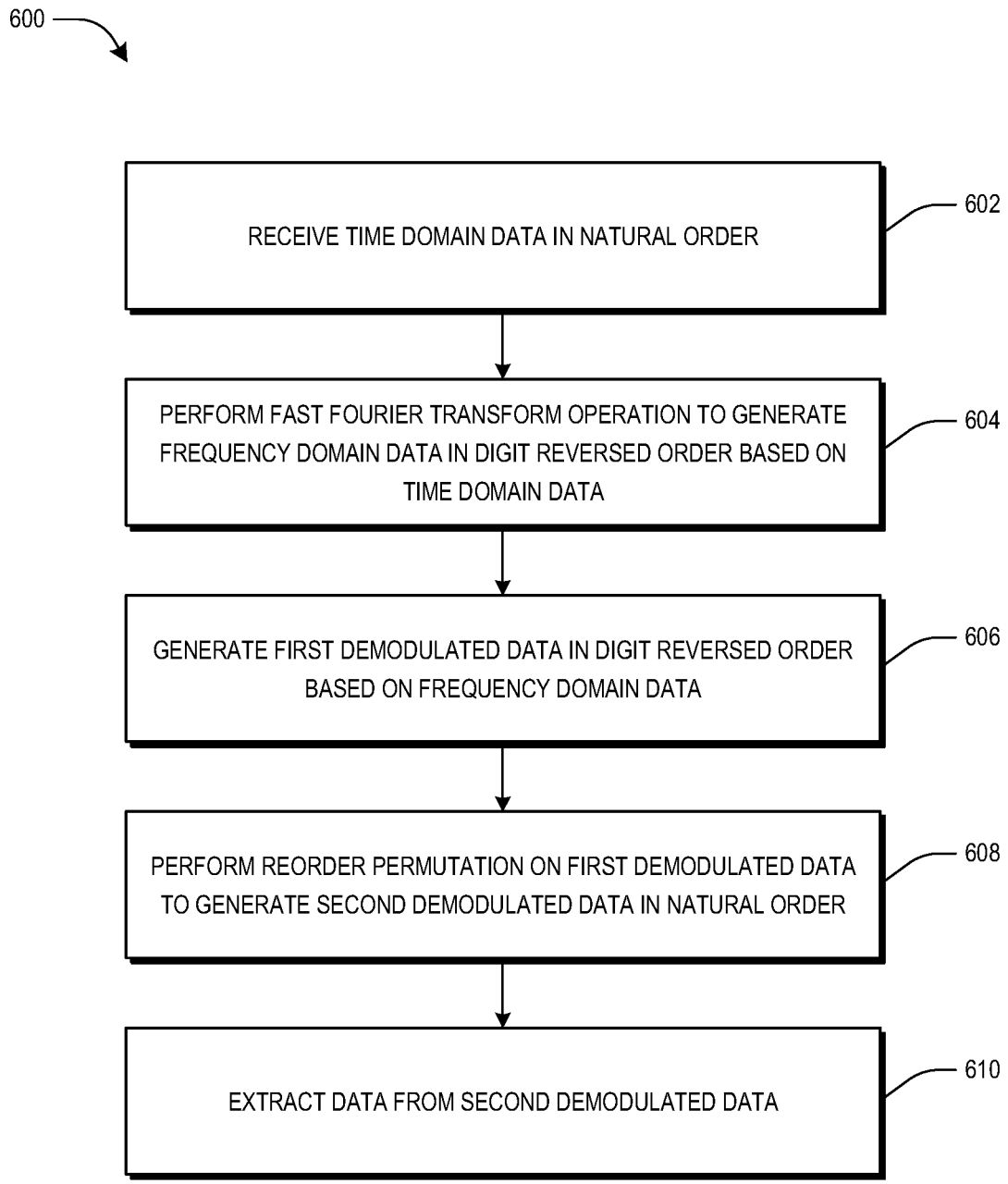
FIG. 6 is a flow chart illustrating an example method for performing digit reversal de-interleaving, in accordance with some embodiments.

FIG. 6 is a flow chart illustrating an example method 600 for performing digit reversal de-interleaving, in accordance with some embodiments. At 602, time domain data is received in natural order. At 604, a fast Fourier transform operation is performed to generate frequency domain data in digit reversed order based on the time domain data. At 606, first demodulated data in digit reversed order is generated based on the frequency domain data. At 608, a reordering permutation is performed on the first demodulated data to generate second demodulated data in natural order. At 610, data is extracted from the second demodulated data.

Figure 7:
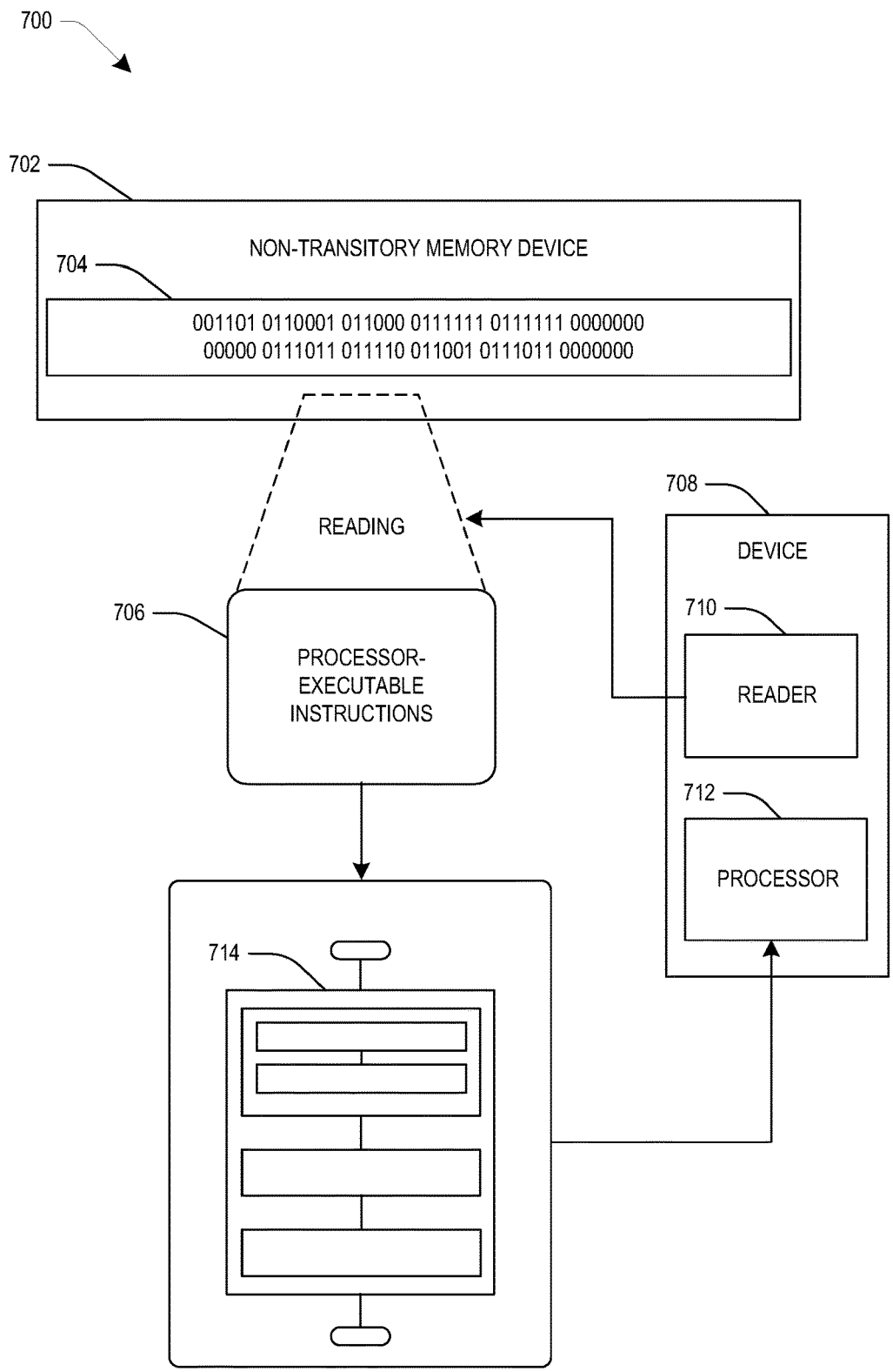
FIG. 7 illustrates an exemplary embodiment of a computer-readable medium, in accordance with some embodiments.

FIG. 7 illustrates an exemplary embodiment 700 of a computer-readable medium 702, in accordance with some embodiments. One or more embodiments involve a computer-readable medium comprising processor-executable instructions configured to implement one or more of the techniques presented herein. The embodiment 700 comprises a non-transitory computer-readable medium 702 (e.g., a CD-R, DVD-R, flash drive, a platter of a hard disk drive, etc.), on which is encoded computer-readable data 704. This computer-readable data 704 in turn comprises a set of processor-executable computer instructions 706 that, when executed by a computing device 708 including a reader 710 for reading the processor-executable computer instructions 706 and a processor 712 for executing the processor-executable computer instructions 706, are configured to facilitate operations according to one or more of the principles set forth herein. In some embodiments, the processor-executable computer instructions 706, when executed, are configured to facilitate performance of a method 714, such as at least some of the aforementioned method(s). In some embodiments, the processor-executable computer instructions 706, when executed, are configured to facilitate implementation of a system, such as at least some of the one or more aforementioned system(s). Many such computer-readable media may be devised by those of ordinary skill in the art that are configured to operate in accordance with the techniques presented herein.

The term "computer readable media" may include communication media. Communication media typically embodies computer readable instructions or other data in a "modulated data signal" such as a carrier wafer or other transport mechanism and includes any information delivery media. The term "modulated data signal" may include a signal that has one or more of its characteristics set or changed in such a manner as to encode information in the signal.

In an embodiment of the techniques presented herein, a receiver is provided. The receiver comprises a receiver front end configured to receive time domain data in natural order, a fast Fourier transform module configured to generate frequency domain data in digit reversed order based on the time domain data, a demodulator configured to generate first demodulated data in digit reversed order based on the frequency domain data, and a de-interleaver configured to perform a reordering permutation on the first demodulated data to generate second demodulated data in natural order.

In an embodiment of the techniques presented herein, the de-interleaver is configured to perform a first reverse permutation on the second demodulated data to generate de-interleaved data.

In an embodiment of the techniques presented herein, the de-interleaver is configured to perform the reordering permutation and the first reverse permutation using a look-up table.

In an embodiment of the techniques presented herein, the de-interleaver is configured to perform a first reverse permutation and a second reverse permutation on the second demodulated data to generate de-interleaved data.

In an embodiment of the techniques presented herein, the de-interleaver is configured to perform the reordering permutation, the first reverse permutation, and the second reverse permutation using a look-up table.

In an embodiment of the techniques presented herein, the receiver comprises a channel equalizer configured to equalize the frequency domain data to generate equalized frequency domain data in digit reversed order, wherein the demodulator is configured to generate the first demodulated data in digit reversed order based on the equalized frequency domain data.

In an embodiment of the techniques presented herein, the receiver comprises a channel estimation and smoothing module configured to generate channel equalization data using training data in the frequency domain data and to configure the channel equalizer based on the channel equalization data.

In an embodiment of the techniques presented herein, the channel estimation and smoothing module is configured to generate the channel equalization data by performing a channel estimation using digit reversed data, performing a time domain channel smoothing operation using natural order data, and transforming data from the time domain channel smoothing operation to generate the channel equalization data in digit reversed order.

In an embodiment of the techniques presented herein, a method is provided. The method comprises receiving time domain data in natural order, performing a fast Fourier transform operation to generate frequency domain data in digit reversed order based on the time domain data, generating first demodulated data in digit reversed order based on the frequency domain data, performing a reordering permutation on the first demodulated data to generate second demodulated data in natural order, and extracting data from the second demodulated data.

In an embodiment of the techniques presented herein, the method comprises performing a first reverse permutation on the second demodulated data to generate de-interleaved data.

In an embodiment of the techniques presented herein, performing the reordering permutation and the first reverse permutation comprises performing the reordering permutation and the first reverse permutation using a look-up table.

In an embodiment of the techniques presented herein, the method comprises performing a first reverse permutation and a second reverse permutation on the second demodulated data to generate de-interleaved data.

In an embodiment of the techniques presented herein, performing the reordering permutation, the first reverse permutation, and the second reverse permutation comprises performing the reordering permutation, the first reverse permutation, and the second reverse permutation using a look-up table.

In an embodiment of the techniques presented herein, the method comprises equalizing the frequency domain data to generate equalized frequency domain data in digit reversed order, and generating the first demodulated data in digit reversed order based on the equalized frequency domain data.

In an embodiment of the techniques presented herein, the method comprises generating channel equalization data using training data in the frequency domain data, wherein equalizing the frequency domain data comprises equalizing the frequency domain data based on the channel equalization data.

In an embodiment of the techniques presented herein, generating the channel equalization data comprises performing a channel estimation using digit reversed data, performing a time domain channel smoothing operation using natural order data, and transforming data from the time domain channel smoothing operation to generate the channel equalization data in digit reversed order.

In an embodiment of the techniques presented herein, a receiver is provided. The receiver comprises a receiver front end configured to receive time domain data in natural order, a fast Fourier transform module configured to generate frequency domain data in digit reversed order based on the time domain data, a channel equalizer configured to equalize the frequency domain data to generate equalized frequency domain data in digit reversed order, a demodulator configured to generate first demodulated data in digit reversed order based on the equalized frequency domain data, a de-interleaver configured to perform a reordering permutation and at least one reverse permutation on the first demodulated data to generate second demodulated data in natural order, and a descrambler configured to extract data from the second demodulated data.

In an embodiment of the techniques presented herein, the receiver comprises a channel estimation and smoothing module configured to generate channel equalization data using training data in the frequency domain data and to configure the channel equalizer based on the channel equalization data.

In an embodiment of the techniques presented herein, the channel estimation and smoothing module is configured to generate the channel equalization data by performing a channel estimation using digit reversed data, performing a time domain channel smoothing operation using natural order data, and transforming data from the time domain channel smoothing operation to generate the channel equalization data in digit reversed order.

In an embodiment of the techniques presented herein, the de-interleaver is configured to perform a first reverse permutation and a second reverse permutation on the second demodulated data to generate de-interleaved data.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A receiver, comprising:
a receiver front end configured to receive time domain data in natural order;
a fast Fourier transform module configured to generate frequency domain data in digit reversed order based on the time domain data;
a demodulator configured to generate first demodulated data in digit reversed order based on the frequency domain data; and
a de-interleaver configured to perform a reordering permutation on the first demodulated data to generate second demodulated data in natural order, wherein:
the de-interleaver is configured to perform a first reverse permutation on the second demodulated data to generate de-interleaved data, and
the de-interleaver is configured to perform the reordering permutation and the first reverse permutation utilizing a look-up table.

2. The receiver of claim 1, wherein:
the de-interleaver is configured to perform the first reverse permutation and a second reverse permutation on the second demodulated data to generate de-interleaved data.

3. The receiver of claim 2, wherein:
the de-interleaver is configured to perform the reordering permutation, the first reverse permutation, and the second reverse permutation utilizing the look-up table.

4. The receiver of claim 1, comprising:
a channel equalizer configured to equalize the frequency domain data to generate equalized frequency domain data in digit reversed order, wherein:
the demodulator is configured to generate the first demodulated data in digit reversed order based on the equalized frequency domain data.

5. The receiver of claim 4, comprising:
a channel estimation and smoothing module configured to generate channel equalization data utilizing training data in the frequency domain data and to configure the channel equalizer based on the channel equalization data.

6. The receiver of claim 5, wherein:
the channel estimation and smoothing module is configured to generate the channel equalization data by performing a channel estimation utilizing digit reversed data, performing a time domain channel smoothing operation utilizing natural order data, and transforming data from the time domain channel smoothing operation to generate the channel equalization data in digit reversed order.

7. A method, comprising:
receiving time domain data in natural order;
performing a fast Fourier transform operation to generate frequency domain data in digit reversed order based on the time domain data;
generating first demodulated data in digit reversed order based on the frequency domain data;

performing a reordering permutation on the first demodulated data to generate second demodulated data in natural order;
performing a first reverse permutation on the second demodulated data to generate de-interleaved data; and
extracting data from the de-interleaved data, wherein:
performing the reordering permutation and the first reverse permutation comprises performing the reordering permutation and the first reverse permutation utilizing a look-up table.

8. The method of claim 7, wherein:
generating the first demodulated data comprises:
performing the first reverse permutation and a second reverse permutation on the second demodulated data to generate the de-interleaved data.

9. The method of claim 8, wherein:
performing the reordering permutation, the first reverse permutation, and the second reverse permutation comprises performing the reordering permutation, the first reverse permutation, and the second reverse permutation utilizing the look-up table.

10. The method of claim 7, comprising:
equalizing the frequency domain data to generate equalized frequency domain data in digit reversed order; and
generating the first demodulated data in digit reversed order based on the equalized frequency domain data.

11. The method of claim 10, comprising:
generating channel equalization data utilizing training data in the frequency domain data, wherein:
equalizing the frequency domain data comprises equalizing the frequency domain data based on the channel equalization data.

12. The method of claim 11, wherein generating the channel equalization data comprises:
performing a channel estimation utilizing digit reversed data;
performing a time domain channel smoothing operation utilizing natural order data; and
transforming data from the time domain channel smoothing operation to generate the channel equalization data in digit reversed order.

13. A receiver, comprising:
a receiver front end configured to receive time domain data in natural order;
a fast Fourier transform module configured to generate frequency domain data in digit reversed order based on the time domain data;
a channel equalizer configured to equalize the frequency domain data to generate equalized frequency domain data in digit reversed order;
a channel estimation and smoothing module configured to generate channel equalization data utilizing training data in the frequency domain data and to configure the channel equalizer based on the channel equalization data;
a demodulator configured to generate first demodulated data in digit reversed order based on the equalized frequency domain data;
a de-interleaver configured to perform a reordering permutation and at least one reverse permutation on the first demodulated data to generate second demodulated data in natural order; and
a descrambler configured to extract data from the second demodulated data.

14. The receiver of claim 13, wherein:
the channel estimation and smoothing module is configured to generate the channel equalization data by performing a channel estimation utilizing digit reversed data, performing a time domain channel smoothing operation utilizing natural order data, and transforming data from the time domain channel smoothing operation to generate the channel equalization data in digit reversed order.

15. The receiver of claim 13, wherein:
the de-interleaver is configured to perform a first reverse permutation and a second reverse permutation on the second demodulated data to generate de-interleaved data.

* * * * *